United States Patent
Lum

(10) Patent No.: US 7,181,486 B1
(45) Date of Patent: Feb. 20, 2007

(54) METHOD AND APPARATUS FOR REMOTE INSTALLATION OF NETWORK DRIVERS AND SOFTWARE

(75) Inventor: Clinton Edward Lum, Foster City, CA (US)

(73) Assignee: Network Ice Corporation, San Mateo, CA (US)

( * ) Notice: Subject to any disclaimer, the term of this patent is extended or adjusted under 35 U.S.C. 154(b) by 0 days.

(21) Appl. No.: 09/456,894

(22) Filed: Dec. 7, 1999

Related U.S. Application Data

(60) Provisional application No. 60/111,292, filed on Dec. 7, 1998.

(51) Int. Cl.
   G06F 15/16     (2006.01)
   G06F 9/44      (2006.01)
   G06F 9/445     (2006.01)

(52) U.S. Cl. ............... 709/200; 717/171; 717/176; 719/319; 719/327

(58) Field of Classification Search ........... 709/203, 709/205, 208, 209, 213, 217, 225, 230, 242, 709/246, 327
See application file for complete search history.

(56) References Cited

U.S. PATENT DOCUMENTS

| | | | |
|---|---|---|---|
| 4,819,234 A | 4/1989 | Huber | |
| 5,278,901 A | 1/1994 | Shieh et al. | 380/4 |
| 5,345,595 A | 9/1994 | Johnson et al. | 455/33.1 |
| 5,414,833 A | 5/1995 | Hershey et al. | 395/575 |
| 5,475,839 A | 12/1995 | Watson et al. | 395/650 |
| 5,557,742 A | 9/1996 | Smaha et al. | 395/186 |
| 5,586,260 A | 12/1996 | Hu | |
| 5,590,331 A | 12/1996 | Lewis et al. | 717/144 |
| 5,606,668 A | 2/1997 | Shwed | |
| 5,623,601 A | 4/1997 | Vu | |
| 5,630,061 A | 5/1997 | Richter et al. | |
| 5,651,059 A * | 7/1997 | Morgan et al. | 379/201.05 |
| 5,664,191 A * | 9/1997 | Davidson et al. | 718/100 |
| 5,761,504 A | 6/1998 | Corrigan et al. | |
| 5,764,887 A | 6/1998 | Kells et al. | |

(Continued)

FOREIGN PATENT DOCUMENTS

WO     WO 00/54458     9/2000

(Continued)

OTHER PUBLICATIONS

Aurobindo Sundaram, "An Introduction to Intrusion Detection", Copyright 1996, published at www.acm.org/crossroads/xrds2-4/intrus.html, pp. 1-12.

(Continued)

*Primary Examiner*—Ario Etienne
*Assistant Examiner*—Hussein Elchanti
(74) *Attorney, Agent, or Firm*—King & Spalding LLP

(57) ABSTRACT

A method and apparatus for remote installation of network drivers and software. The present invention provides for the remote installation of a rerouting driver into the network driver interface in the path between one or more media access control units and one or more protocol drivers in a computer system. Code in the network driver interface is disabled, patched to insert the rerouting driver, and then re-enabled. The disabling and re-enabling of the code is performed such that the computer system does not have to be restarted following installation of the patch.

15 Claims, 10 Drawing Sheets

U.S. PATENT DOCUMENTS

| | | | | |
|---|---|---|---|---|
| 5,764,890 | A | 6/1998 | Glasser et al. | |
| 5,781,776 | A * | 7/1998 | Johnston et al. | 717/130 |
| 5,787,177 | A | 7/1998 | Leppek | |
| 5,796,942 | A | 8/1998 | Esbensen | |
| 5,798,706 | A | 8/1998 | Kraemer et al. | |
| 5,815,574 | A | 9/1998 | Fortinsky | |
| 5,828,833 | A | 10/1998 | Belville et al. | |
| 5,832,208 | A | 11/1998 | Chen et al. | |
| 5,832,211 | A | 11/1998 | Blakley, III et al. | |
| 5,835,726 | A | 11/1998 | Shwed et al. | |
| 5,838,903 | A | 11/1998 | Blakely, III et al. | |
| 5,857,191 | A | 1/1999 | Blackwell, Jr. et al. | |
| 5,864,665 | A | 1/1999 | Tran | |
| 5,875,296 | A | 2/1999 | Shi et al. | |
| 5,881,236 | A | 3/1999 | Dickey | |
| 5,884,033 | A | 3/1999 | Duvall et al. | |
| 5,950,012 | A | 9/1999 | Shiell et al. | |
| 5,964,839 | A | 10/1999 | Johnson et al. | |
| 5,983,270 | A | 11/1999 | Abraham et al. | |
| 5,987,606 | A | 11/1999 | Cirasole et al. | |
| 5,987,611 | A | 11/1999 | Freund | |
| 6,009,274 | A * | 12/1999 | Fletcher et al. | 717/173 |
| 6,014,645 | A | 1/2000 | Cunningham | 705/38 |
| 6,014,740 | A * | 1/2000 | Shearer, Jr. | 712/233 |
| 6,016,553 | A | 1/2000 | Schneider et al. | |
| 6,026,442 | A | 2/2000 | Lewis et al. | 709/229 |
| 6,035,423 | A | 3/2000 | Hodges et al. | |
| 6,041,347 | A | 3/2000 | Harsham et al. | |
| 6,061,795 | A | 5/2000 | Dircks et al. | |
| 6,073,172 | A * | 6/2000 | Frailong et al. | 709/222 |
| 6,085,224 | A | 7/2000 | Wagner | |
| 6,088,803 | A | 7/2000 | Tso et al. | |
| 6,098,173 | A | 8/2000 | Elgressy et al. | |
| 6,119,234 | A | 9/2000 | Aziz et al. | |
| 6,158,018 | A * | 12/2000 | Bernasconi et al. | 714/8 |
| 6,173,413 | B1 * | 1/2001 | Slaughter et al. | 714/6 |
| 6,195,687 | B1 * | 2/2001 | Greaves et al. | 709/208 |
| 6,247,175 | B1 * | 6/2001 | Ledford et al. | 717/157 |
| 6,260,157 | B1 * | 7/2001 | Schurecht et al. | 714/8 |
| 6,266,774 | B1 | 7/2001 | Sampath et al. | 713/201 |
| 6,275,938 | B1 | 8/2001 | Bond et al. | 713/200 |
| 6,314,525 | B1 * | 11/2001 | Mahalingham et al. | 714/4 |
| 6,381,218 | B1 * | 4/2002 | McIntyre et al. | 370/245 |
| 6,405,318 | B1 | 6/2002 | Rowland | 713/200 |
| 6,496,858 | B1 * | 12/2002 | Frailong et al. | 709/221 |
| 6,718,383 | B1 * | 4/2004 | Hebert | 709/224 |
| 6,721,806 | B2 * | 4/2004 | Boyd et al. | 719/312 |

FOREIGN PATENT DOCUMENTS

| | | |
|---|---|---|
| WO | WO 01/84285 | 11/2001 |
| WO | WO 02/06928 | 1/2002 |
| WO | WO 02/056152 | 7/2002 |

OTHER PUBLICATIONS

Didier Samfat, Refik Molva, IDAMN: An Intrusion Detection Architecture for Mobile Networks, IEEE Journal on Selected Areas in Communications, vol. 15, No. 7, Sep. 1997, pp. 1373-1380.

International Preliminary Examination Report No. PCT/US99/29117, International filing date Dec. 7, 1999.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www.bfs.ucsd.edu/mss/esos/man3.htm, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

* cited by examiner

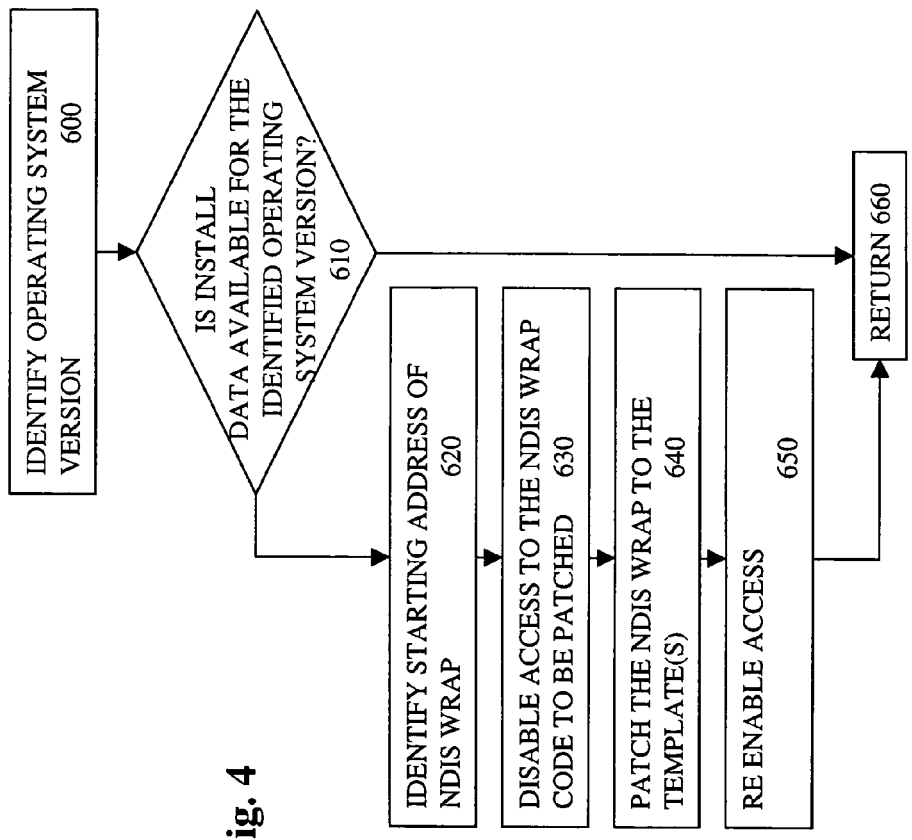
Fig. 4
Fig. 6
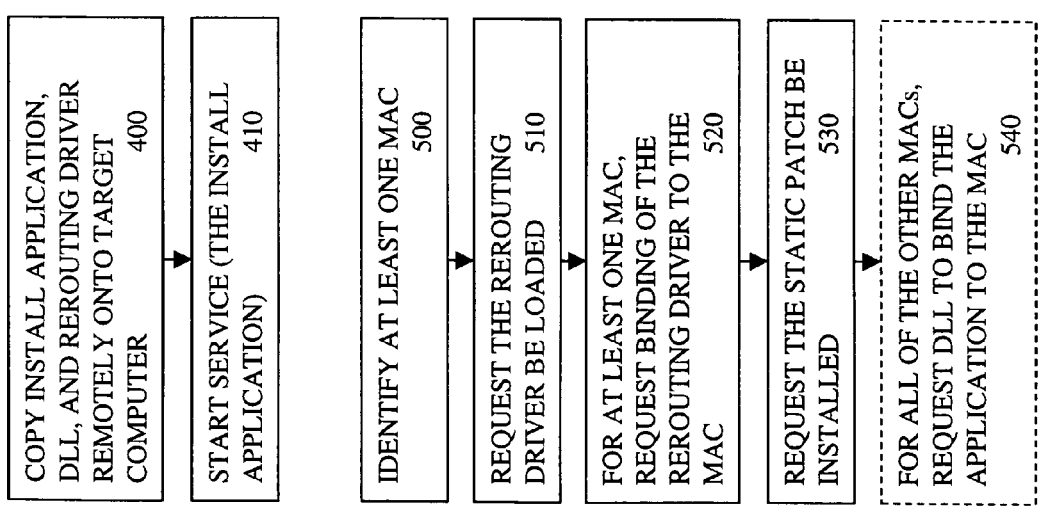
Fig. 5

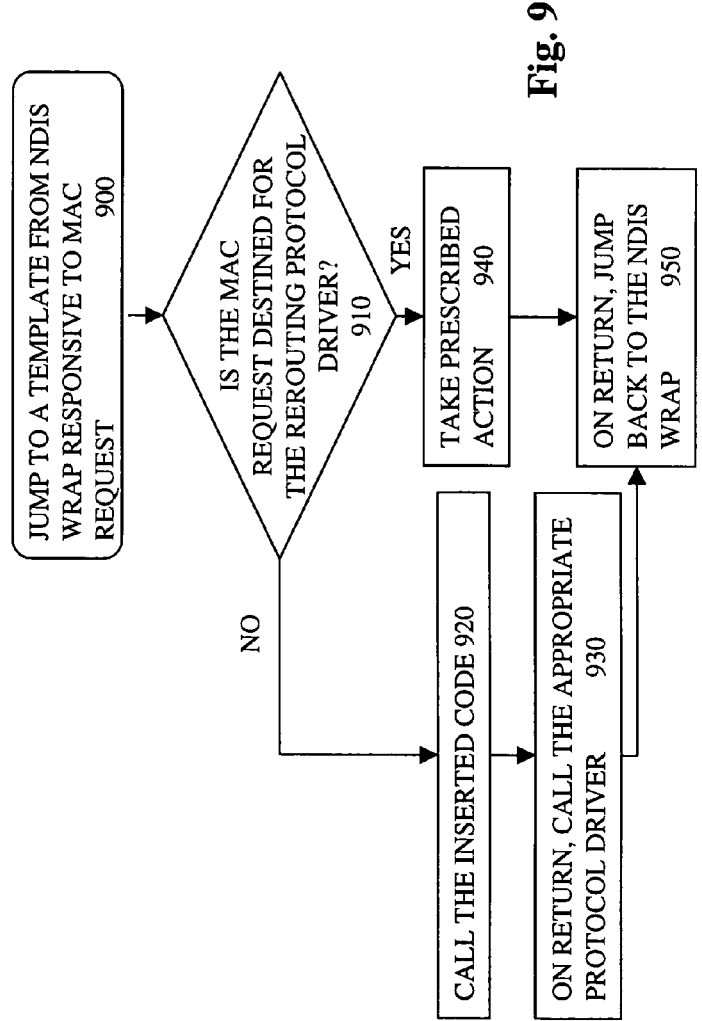

METHOD AND APPARATUS FOR REMOTE INSTALLATION OF NETWORK DRIVERS AND SOFTWARE

CROSS-REFERENCE TO RELATED APPLICATIONS

This application claims the benefit of U.S. Provisional Application No. 60/111,292, filed Dec. 7, 1998.

BACKGROUND OF THE INVENTION

1. Field of the Invention

The present invention relates to the field of networked computer systems. More specifically, the invention relates to a method and apparatus for remote installation of network drivers and software in a computer system.

2. Background Information

Computer systems often communicate information with sources external to the computer, for example, over one or more networks. This information is frequently sent as smaller packets of information and transported over various network topologies, such as "Ethernet". The routing of the information is by various formats, or network protocols, for example, TCP/IP. In order for an end computer to receive and utilize the information, the computer must have the appropriate network protocol driver (hereinafter termed protocol driver). A protocol driver is usually connected in a computer's internal communication path between the network connection and an end application.

FIG. 1 is a block diagram illustrating media access control (MAC) unit to application communication according to the prior art. The block diagram is a simplified illustration of a computer system utilizing the Microsoft® Windows operating systems (e.g., Windows 95, Windows 98, Windows NT, etc.) (Manufactured by Microsoft Corp. of Redmond, Wash.). Information is initially received, for example, as packets, from the network by a media access control unit (MAC) 120. The MAC 120 is used to control access to the physical transmission medium on a network. The MAC 120 routes the information to the NDIS 115. The NDIS 115 is a network driver interface. The NDIS 115 receives the information and routes it to the appropriate protocol driver(s) shown as protocol driver(s) 110 (e.g., a TCP/IP driver). The protocol driver 110 receives the information and routes it to the WINSOCK 105. The WINSOCK is a interface program (Manufactured by Microsoft Corp. of Redmond, Wash.). The WINSOCK 105 receives the information and routes it to the appropriate application(s) 100.

At certain times it is useful to insert a different protocol driver into the existing communication path (hereinafter termed the binding) between the MAC 120 and the protocol driver(s) 110. When a new protocol driver is added to the existing binding, a new binding must be established which incorporates the new protocol driver. The new binding links the new protocol driver to the MAC 120.

FIG. 2 is a block diagram illustrating a prior art technique of inserting an intermediate driver in the system of FIG. 1. The intermediate driver is used to install a new protocol driver on an existing computer system. This method is more fully described in the "README" file for the ImSamp intermediate driver sample, IMSAMP.SYS. (Available from Microsoft Corp. of Redmond, Wash.).

In this method, the intermediate protocol driver 125 is bound to the NDIS 115. At Number 1, the MAC 120 routes information to the NDIS 115. At Number 2, the NDIS 115 receives the information and routes it to the intermediate protocol driver 125. Within the intermediate protocol driver 125, the information is passed to the inserted protocol driver 130 through the new binding. From the inserted protocol driver 130, the information is converted to the MAC layer format by MAC 135 in the intermediate protocol driver 110. At Number 3, the information is then passed from the MAC 135 to the NDIS 115 to enable continued routing of the information to the protocol driver 110. From the protocol driver 110, the information passes to the WINSOCK 105 and on to the appropriate application(s) 100.

The above-described prior art method has several limitations that impact its utility, particularly when implemented on networks with large numbers of computers. First, the intermediate protocol driver software must be manually installed on each computer. An individual, for example, a systems technician, must physically go to every computer and manually load the intermediate protocol driver software and the new protocol driver. This may involve a substantial time investment when many computers are involved simply to load the software. It also results in lost productivity for the computer operator as in-use applications must be exited during installation. Second, to enable the operation of the new protocol driver, the computer must be shut down and restarted. The necessity of shutdown and restart also requires that in-use applications be saved and exited. Where large numbers of computers are involved, this may result in large losses of productivity and can be disruptive of services provided by the network.

It should be noted that some operating systems provide mechanisms to remotely distribute software over the network. These systems generally include a server to which several computers are connected. In a remote distribution, the new software is loaded onto the server and then distributed to each of the individual computers, thus reducing installation time. However, even with the remote distribution, the installation of an intermediate protocol driver requires a user (e.g., a system technician) exit existing in-use applications, perform the installation, shut down the computer system, and then restart the computer system to enable operation of the new protocol driver.

BRIEF SUMMARY OF THE INVENTION

The present invention provides a method and apparatus for remote installation of network drivers and software. According to one embodiment of the invention, there is provided a computer implemented method for transmitting an installation application and a rerouting driver from a remote host to a first target computer on a network; the first target computer including a network driver interface that provides for communication between one or more media access control units and one or more protocol drivers according to a set of bindings. The remote host transmits to the first target computer a command to cause the first target computer to execute the installation application. In response to receipt of the command, the first target computer executes the installation application. Responsive to execution of the installation application, the first target computer causes the modification of the network driver interface to insert the rerouting driver into the one or more communication paths provided by the set of bindings without restarting the first target computer.

BRIEF DESCRIPTION OF THE DRAWINGS

The invention may best be understood by referring to the following description and accompanying drawings which are used to illustrate embodiments of the invention. In the drawings:

FIG. 4 is a flow diagram illustrating the remote installation of the rerouting driver according to one embodiment of the invention;

FIG. 5 is a flow diagram illustrating the operation of the install application 325 according to one embodiment of the invention;

FIG. 6 is a flow diagram illustrating the operation of the static patching code 365 according to one embodiment of the invention;

FIG. 7 is a block of unmodified instruction code from the NDIS 315 prior to insertion of static patching code 365;

FIG. 8 is a diagram illustrating the patching of the NDIS 315 to call to one of template(s) 350 according to one embodiment of the invention;

FIG. 9 is a flow diagram illustrating the operation of one of template(s) 350 according to one embodiment of the invention;

DETAILED DESCRIPTION OF THE INVENTION

In the following description, numerous specific details are set forth to provide a thorough understanding of the invention. However, it is understood that the invention may be practiced without these specific details. In other instances, well-known connections, structures and techniques have not been shown in detail in order not to obscure the invention.

A method and apparatus for remote installation of network drivers and software in a computer system is described. To accomplish this, the invention allows for the remote installation of a rerouting driver in such a way that operation of the computer system can continue during installation, and the computer system does not require a shutdown and restart to enable operation of the rerouting driver.

Figure 3:
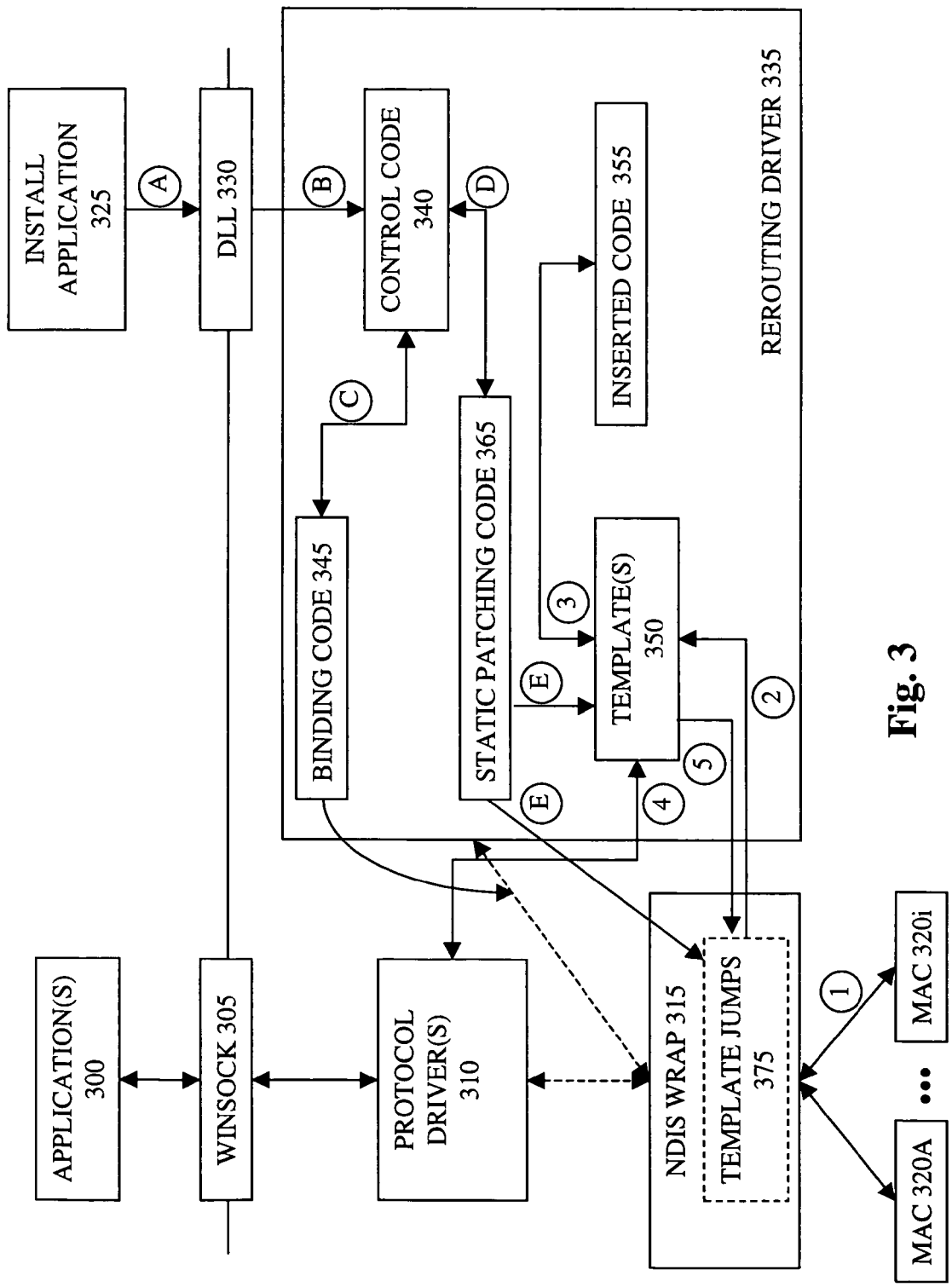
FIG. 3 is a block diagram illustrating the static patching of a rerouting driver between a MAC and protocol drivers according to one embodiment of the invention.

FIG. 3 is a block diagram illustrating the static patching of a rerouting driver between a MAC and protocol drivers according to one embodiment of the invention. Existing or future bindings resulting from the insertion of the rerouting driver are shown in solid lines. Existing or future bindings rerouted by the insertion of the rerouting driver are shown in dashed lines.

FIG. 3 shows, similar to the prior art, network information, such as packets, received by one or more MACs 320 A-i being routed to the NDIS 315. Prior to the installation of the static patch, the NDIS 315 routes the information to one or more protocol driver(s) 310. The protocol driver(s) 310 then routes the information to the WINSOCK 305 for further routing to the appropriate application(s) 300.

Either via remote distribution from a remote host (not shown) or by directly loading, an install application 325, DLL 330, and rerouting driver 335 are copied to memory in the target computer and the install application 325 is started. The install application 325 through the interface provided by the DLL 330 (see letters A and B) requests the rerouting driver 335 be loaded. The install application 325 requests control code 340 execute binding code 345 to establish a new binding between the rerouting driver 335 and at least one MAC 320A (see letter C). The install application 325 then requests control code 340 install the static patching code 365 (see letter D). At letter E, the static patching code 365 inserts template jump(s) 375 from the NDIS 315 to template(s) 350 in the rerouting driver 335. Particularly, NDIS 315 contains code with generic calls to perform information communication between the MAC(s) 320 and protocol driver(s) 310. The static patch replaces each of these calls with a jump to one of the template(s) 350. Details of the static patching code installation are later described herein with reference to FIG. 6. The binding may be continued for each MAC 320. After installation, the install application 325 may be deleted. At the completion of the static patch, the rerouting driver 335 has been inserted at the NDIS 315 between the MAC(s) 320 and the protocol driver(s) 310.

At Number 1, following the static patch, information received by one or more MAC(s) 320 is routed to the NDIS 315. At Number 2, information destined for protocol driver(s) 310 is then jumped from one of template jump(s) 375 to one of template(s) 350 in the rerouting driver 335. At Number 3, information received by the template(s) 350 can be routed to the inserted code 355. The inserted code 355 may be a new protocol driver, or another program, for example, a security program that can prevent further routing of the information. When the inserted code 355 is completed, the information is routed back to the template(s) 350. At Number 4, the template(s) 350 may route the information on to the protocol driver 310, or the information can be discarded if it is not desirable to pass the information further. At Number 5, a return jump to the NDIS 315 is executed.

It should be noted that, following installation of the static patching code 365, there are two types of bindings to the NDIS 315 over which the same information will be communicated. One binding was established on the initial binding of the NDIS 315 to the rerouting driver 335; this binding is represented in FIG. 3 as the dashed line between the NDIS 315 and the rerouting driver 335. The second type of binding is the original binding(s) between the NDIS 315 and the protocol driver(s) 310; these binding(s) are represented in FIG. 3 as the dashed line between the NDIS 315 and the protocol driver(s) 310. These bindings are essentially removed by the static patching because the rerouting driver 335 intercepts the call to the protocol driver 310 and later issues the call to the protocol driver(s) 310 on completion of the inserted code 355. To ensure that only one transmission of the information is routed to protocol driver 310, the rerouting driver 335 examines the incoming transmissions to determine if the information is destined for one of the protocol driver(s) 310 or itself. Information destined for one of the protocol driver(s) 310 is passed onto the inserted code 355. Information destined for the rerouting driver 335 can be discarded or be utilized for other purposes, for example, security purposes.

FIG. 4 is a flow diagram illustrating the remote installation of the rerouting driver 335 according to one embodiment of the present invention. At block 400, install application 325, the DLL 330, and rerouting driver 335 are remotely copied into the memory of a target computer networked from a remote host (not shown). At block 410, install application 325 is started using well-known remote service request techniques. It is to be noted that remote installation requires the manual installation of the software only at the remote host computer. A systems technician loads the software once at the remote host and then the software is copied to the other individual computers on the network. Thus, a systems technician does not waste productive time loading installation software at each individual computer in a network.

FIG. 5 is a flow diagram illustrating the operation of the install application 325 according to one embodiment of the invention. Once the install application 325 is started, at block 500, install application 325 identifies at least one MAC 320X. When a MAC 320X is identified, at block 510, install application 325 requests rerouting driver 335 be loaded. At block 520, install application 325 requests control code 340 execute binding code 345 to bind rerouting driver 335 to MAC 320X. At block 530, install application 325 requests control code 340 execute the static patching code 365. Operation of the static patching code 365 is further described herein with reference to FIG. 6. Once the static patching code 365 has been executed, at block 540, the install application 325 optionally requests DLL 330 to bind the install application 325 to any other MAC(s) 320. When all the MAC(s) 320 have been bound, the install application 325 may be deleted.

FIG. 6 is a flow diagram illustrating the operation of the static patching code 365 according to one embodiment of the invention. At block 600, control code 340 identifies the operating system version of the computer system. This step is necessary as static patching code 365 is selectively configured for different operating system versions. The selective configuration is predetermined by evaluating each version of an operating system to determine the offsets of the protocol driver(s) CALLs in the instruction code of the NDIS 315. These addresses can be determined using well-known debugging techniques.

At block 610, control code 340 identifies whether offset data is available for the identified operating system version to allow the installation of static patching code 365. If the offset data is not present, control code 340 returns to install application 325 for user notification (block 660). If the offset data is present, control code 340 identifies the starting memory address of NDIS 315 instruction code (see block 620). In block 630, control code 340 disables access to at least the specific code in the NDIS 315 that will be patched. In certain single processor computer systems, block 630 can be performed by disabling all interrupts. Techniques for performing block 630 in a multiprocessor computer system are later described herein with reference to FIG. 12.

In block 640, the instruction code in the NDIS 315 is statically patched with static patching code 365 by overwriting the instructions in each predetermined memory address (using the predetermined offsets) with template jump(s) 375 to template(s) 350 in the rerouting driver 335. The overwriting of the instructions with the static patch code 365 is later described herein with reference to FIGS. 7 and 8.

At block 650, control code 340 reenables access to the code in NDIS 315 that is now patched. In block 660, control code 340 returns to install application 325. The disabling and re-enabling of access to the code being patched in the NDIS 315 allows the patching (and thus the rerouting driver installation) to be performed without exiting in-use applications and a system shutdown/restart.

FIG. 7 is a block of unmodified instruction code from the NDIS 315 prior to insertion of static patching code 365. When NDIS 315 reaches instruction "CALL X" in the instruction stack, NDIS 315 calls the protocol driver currently identified by the variable "X" (e.g., one of the protocol driver(s) 310). During installation of static patching code 365, the instruction "CALL X" is overwritten with a template jump 375. The overwrite replaces the "CALL X" with a jump to one of the template(s) 350 in the rerouting driver 335, so that the template 350 instructions are executed instead of the call to the intended routines for the protocol driver X.

FIG. 8 is a diagram illustrating the patching of the NDIS 315 to call to one of templates(s) 350 according to one embodiment of the invention. The patching involves overwriting of the "CALL X" instruction with a template jump 375—a "JUMP" to a template 350 address in the rerouting driver 335. It should be noted that the length of the jump instruction overwrites both "CALL X" and "<INSTRUCTION 920>" previously shown in FIG. 7. The "JUMP" is then made to the address of the template 350. The template 350 may include new instructions (e.g., instruction 950) in which additional inserted code 355 may be executed or called. At the completion of additional inserted code 355, the template 350 would then execute the "CALL X" and the other replaced instructions (e.g., "<INSTRUCTION 920>") and jump back to the next address in NDIS 315, i.e., "<INSTRUCTION 930>". In this manner, a static patch to the rerouting driver 335 is introduced in the NDIS 315. This overwriting at specific memory addresses in the instruction code of the NDIS 315 is repeated until all the calls for that operating system are overwritten with different template jumps 375 which correspond to different templates 350.

FIG. 9 is a flow diagram illustrating the operation of one of template(s) 350 according to one embodiment of the invention. At block 900, a jump from a template jump 375 in the NDIS 315 to a template 350 is made responsive to a MAC request. As earlier discussed, this MAC request can be to a protocol driver 310 or to the rerouting driver 335 due to a dual binding established during installation of the static patching code 365. At block 910, the template 350 determines if the information is destined for the rerouting driver 335.

If the information was not destined for the rerouting driver 335, then it was destined for one of the protocol driver(s) 310 and the information was received through the static patching code 365. At block 920, the information is then routed to the inserted code 355. At completion of the inserted code 355, the information may or may not be routed to the appropriate protocol driver 310 via a CALL, depending upon the outcome of the inserted code 355 instructions. At block 930, if the call is to be routed on to the appropriate protocol driver(s) 310, upon return from the inserted code 355, the appropriate protocol driver 310 is called. At block 950, on return from the call, then a jump back from the template 350 to the NDIS 315 is executed. Alternatively, if the call was not to be routed on to the protocol driver(s) 310, the jump back to the NDIS 315, at block 950, is executed without routing the information to the protocol driver 310.

If the information is destined for the rerouting driver 335, the information was received through the binding of the NDIS 315 to the rerouting driver 335. At block 940, the template 350 would then execute a predetermined prescribed action. This action could be to discard the information, or to route the information to other code instructions. At block 950, on return from the prescribed action, the return jump back to the NDIS 315 is executed.

Thus, one embodiment of the present invention provides a method and apparatus for the remote installation of network drivers and software from a central host computer. The present invention may provide substantial advantages over the prior art techniques, especially when used on large networks of computers.

First, the remote installation of the present invention only requires a systems technician to install the application on a host computer for distribution to individual computers connected to the host. The remote installation alleviates the need for the system technician to manually load the software at each individual computer.

Second, the remote installation can be accomplished while the in-use system remains operating and does not require the shutdown and startup of the system to enable the operation of the new drivers and/or software. This alleviates the need to save and exit existing applications during installation and may result in a preservation of productive work time and system access.

Figures 1, 2:
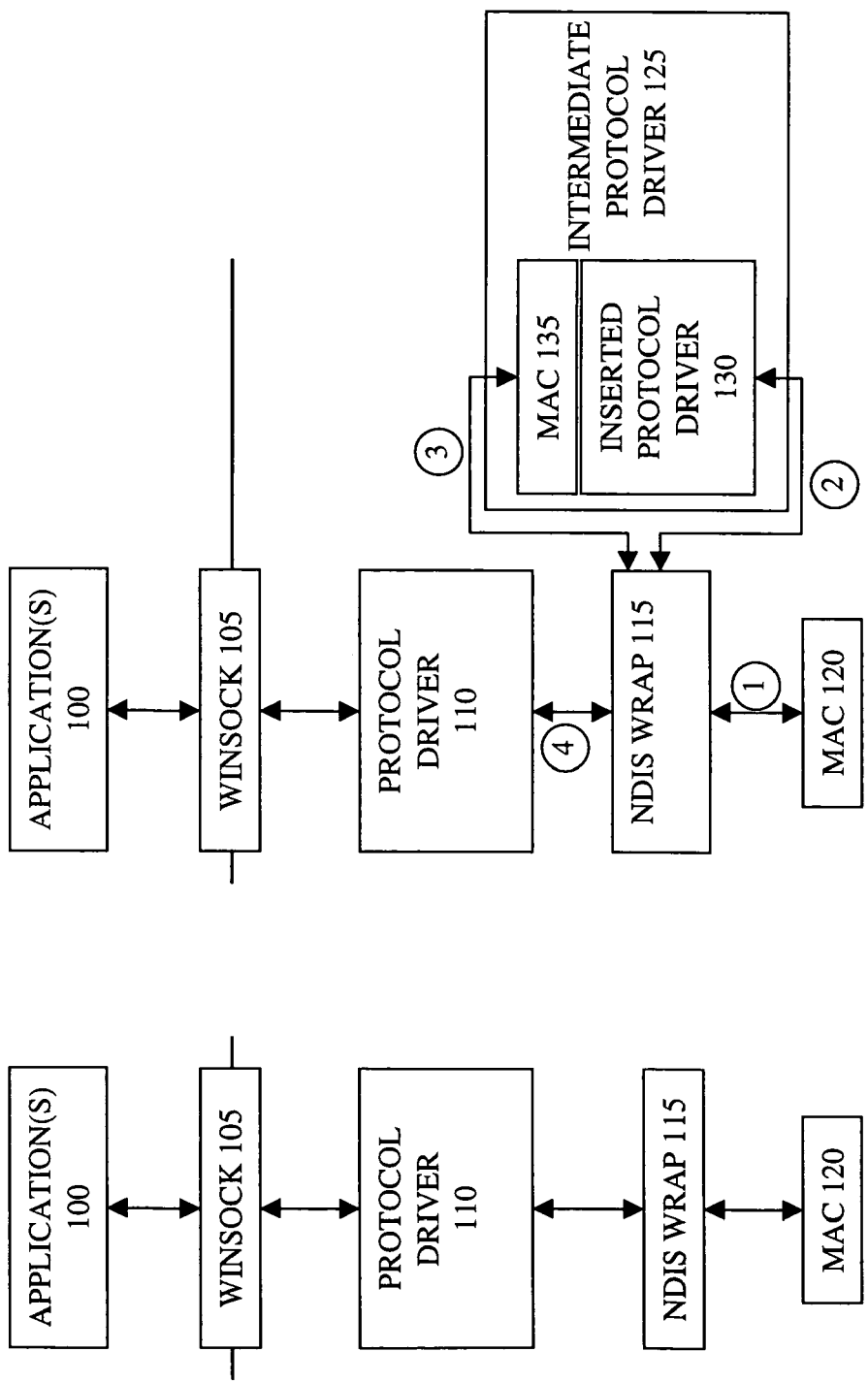
FIG. 1 is a block diagram illustrating MAC to application communication according to the prior art.
FIG. 2 is a block diagram illustrating a prior art technique of inserting an intermediate driver in the system of FIG. 1.

Third, the prior art described with reference to FIG. 2 required that the information received by the intermediate protocol driver be converted by the intermediate protocol driver back into the MAC layer format for routing through the NDIS to the protocol drivers. Thus, a packet is converted from the MAC layer to the protocol layer format twice (a first time when originally transmitted from the MAC to the rerouting driver through the NDIS, and a second time when transmitted from the intermediate driver to the protocol driver through the NDIS). In contrast, the present invention does not require the second conversion to a MAC layer format to route the information from the rerouting driver to the protocol driver.

Although the above-described embodiment of the present invention was described in terms of a remote installation, it is to be understood that the invention can be manually installed on individual computers if so desired.

ALTERNATIVE EMBODIMENTS

The above-described embodiment of the present invention provides a method and apparatus for the remote installation of network drivers and software. Another embodiment of the present invention utilizes the remote installation embodiment to install a distributed packet based security system on one or more individual computers of a network.

Currently networked computers are vulnerable to electronic intrusions over the network, for example, via the Internet. To restrict access to the computers on a network, computer networks often employ computer security measures that limit access to the network based on selected parameters.

Figure 10:
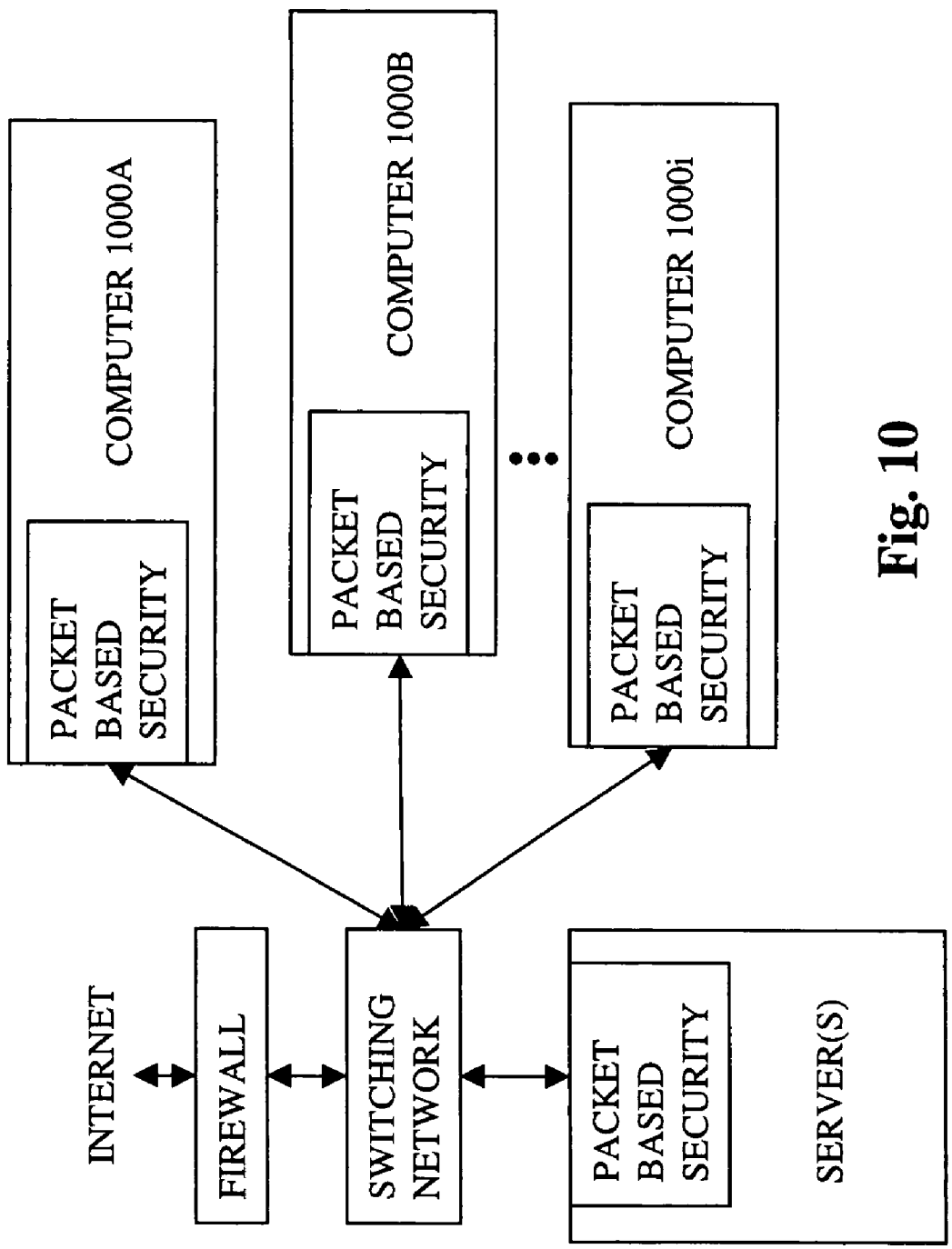
FIG. 10 is a block diagram illustrating a network with distributed packet based security according to one embodiment of the invention.

FIG. 10 is a block diagram illustrating a network with distributed packet based security according to one embodiment of the invention. Initial access security to the switching network is provided by a firewall. A firewall generally blocks access to a system except to those given access rights on an individual basis. The access requirements must be continually updated to remain current and effective. With large computer networks, maintaining current individual access authorizations can be time consuming and difficult to maintain. Therefore, another security measure, independent of the an access list, is a packet based security system.

Due to the ease of installation and/or low cost, the packet based security system can be installed on one or more of the server(s) and/or one or more of the individual computers 1000 A-i. The packet based security system evaluates the packets of information received over the network according to some predetermined standard.

In one embodiment of the present invention, a rerouting driver for a distributed packet based security system is provided which can evaluate received network information against predetermined and/or dynamic parameters. Based on those parameters, the system can either prevent or allow continued transmission of the information to a protocol driver. In this manner, undesirable information is stopped at the NDIS level and does not enter into the protocol driver or application level of a computer. Additionally, the invention provides the capability to save the non-transmitted information for further security evaluation. Further, the invention can be distributed and then installed on individual computers through a remote host while in operation (without shutdown and restart of each computer system).

Figure 11A:
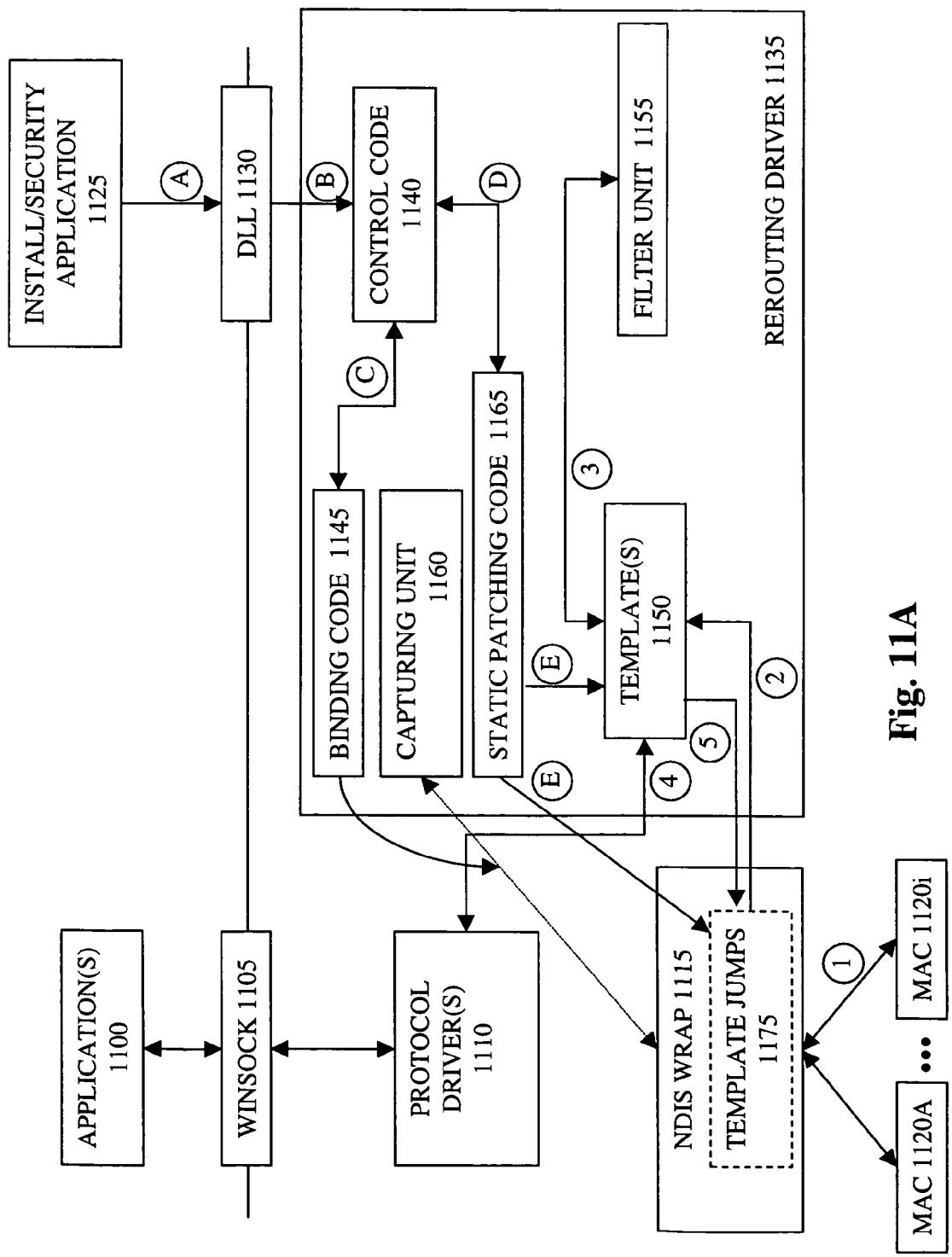
FIG. 11A is a block diagram illustrating the installation and partial operation of a rerouting driver for packet based security according to one embodiment of the invention.

FIG. 11A is a block diagram illustrating the installation and partial operation of a rerouting driver for packet based security according to one embodiment of the invention. Network information received by one or more MAC(s) 1120 is routed to the NDIS 1115. Prior to the installation of the rerouting driver 1135, the NDIS 1115 routes the information to the protocol driver 1110. The protocol driver 1110 then routes the information to the WINSOCK 1105 for further routing to the appropriate application 1100.

As previously described, the install/security application 1125, DLL 1130, and rerouting driver 1135 are copied to memory in the target computer and the install/security application 1125 is started. The install/security application 1125 through the interface provided by the DLL 1130 (see letters A and B) requests the rerouting driver 1135 be loaded. The install/security application 1125 requests control code 1140 execute binding code 1145 to establish a new binding between the capturing unit 1160 in the rerouting driver 1135 and at least one MAC 1120, referred to as MAC 1120X (see letter C). The install/security application 1125 then requests control code 1140 install the static patching code 1165 (see letter D). At letter E, the static patching code 1165 inserts template jumps 1175 from the NDIS 1115 to templates 1150 in the rerouting driver 1135. The binding to the capturing unit 1160 continues for each of the remaining MACs 1120 A-i. At the completion of the static patch, the rerouting driver 1135 has been inserted at the NDIS 1115 between the MAC(s) 1120 and the protocol driver(s) 1110.

As earlier described, there are now at least two bindings for each MAC. One binding was established on the initial binding of the NDIS 1115 to the capturing unit 1160 in the rerouting driver 1135; this binding is represented in FIG. 11A as the dashed line between the NDIS 1115 and the capture unit 1160. The remaining binding(s) are the original bindings between the NDIS 1115 and the protocol driver(s) 1110 which have been diverted to the rerouting driver 1135 by the static patch (not shown). As a result, for a given packet received from a MAC, the NDIS 1115 will attempt to CALL at least one of the protocol driver(s) 1110 and the capturing unit 1160. However, due to the static patch, each attempt will result in entry into one of the template(s) 1150. The circled numbers 1–5 in FIG. 11A illustrate when the NDIS 1115 attempts to CALL one of the protocol driver(s) 1110, while the circled numbers in FIG. 11B illustrates when the NDIS 1115 attempts to call the capturing unit 1160.

With reference to FIG. 11A, at Number 1, a request is made to the NDIS 1115 from a MAC 1120. At Number 2, a jump to a template 1150 is received from the template jump 1175 in the NDIS 1115 (upon an attempted call to the protocol driver 1110). The template 1150 determines if the request was destined for the rerouting driver 1135. If the answer is yes, then further actions related to packet based security are taken as later described herein with reference to FIG. 11B. If the answer is no, then the information was destined for a protocol driver 1110 (the topic of FIG. 11A).

At Number 3, the information is then routed to the filter unit 1155. The filter unit 1155 may include code to evaluate the information to determine if the information should be passed to the intended protocol driver 1110. If it is not desirable to pass the information further, the information can be discarded or further utilized by the filter unit 1155 and, at Number 5, a jump back to the NDIS 1115 is executed. If the information is determined to be acceptable, the information is routed back to the template 1150. At Number 4, the template 1150 then routes the information to the protocol driver 1110 by performing the CALL X extracted form the NDIS 1115 during the patching. At Number 5, on return from the protocol driver 1110 to the template 1150, a return jump to the NDIS 1115 is executed.

Figure 11B:
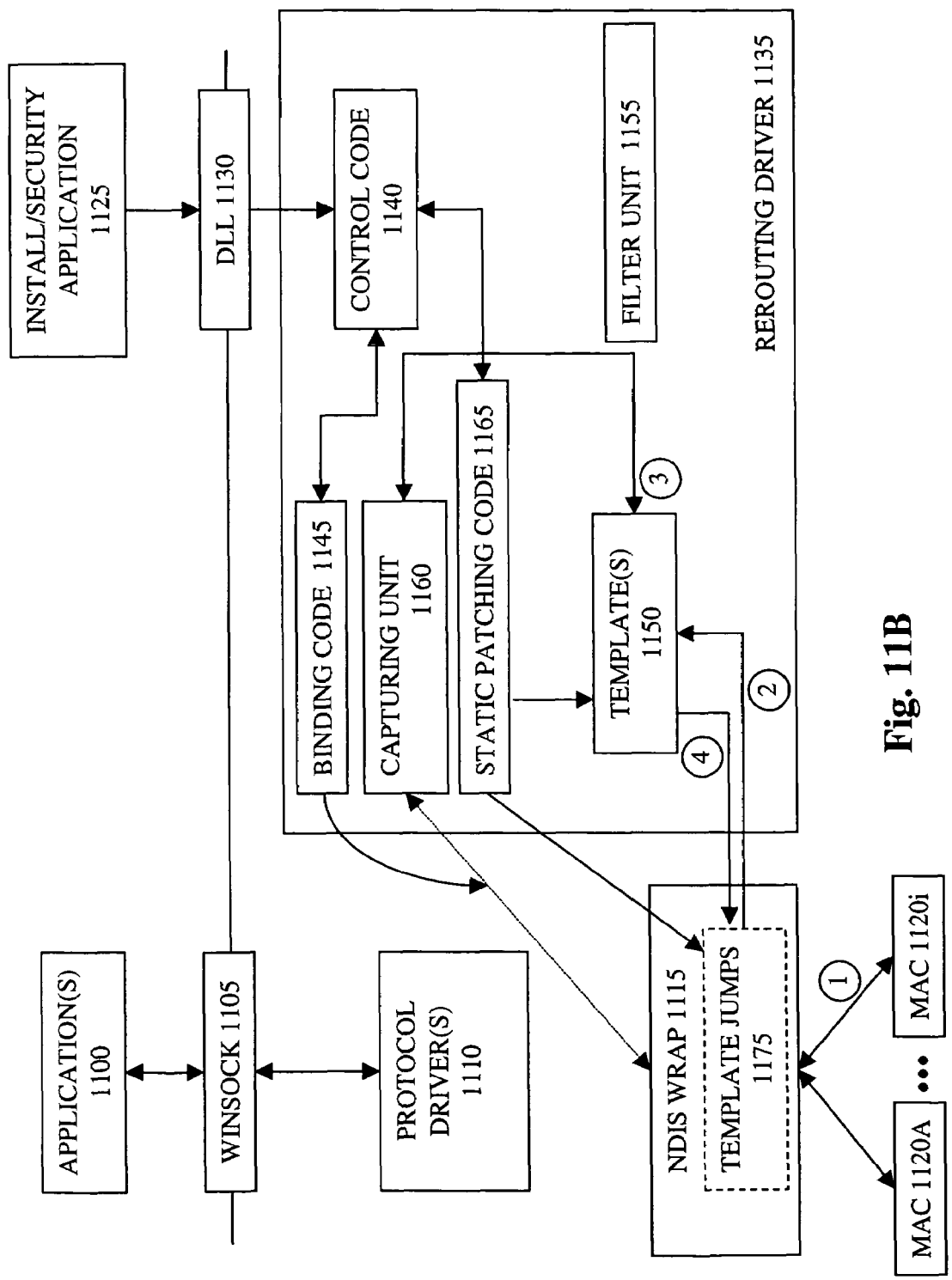
FIG. 11B is a block diagram illustrating another part of the operation of the rerouting driver for packet based security according to one embodiment of the invention.

FIG. 11B is a block diagram illustrating another part of the operation of the rerouting driver for packet based security according to one embodiment of the invention. Particularly, when the NDIS 1115 is attempting to call the rerouting driver 1135. In this case, at Number 2 a jump to template 1150 is again received from the template jump 1175 in the NDIS 1115 (upon the attempted call the rerouting driver 1135). The template 1150 determines the request was destined for the rerouting driver 1135. At Number 3, the information is passed to the capturing unit 1160 (e.g., by performing the CALL X extracted from the NDIS 1115 during patching). The capturing unit 1160 then saves the information according to predetermined instructions for further security evaluation, and at Number 4, a jump back to the NDIS 1115 is executed.

In one embodiment, further security evaluation of the information saved by the capturing unit 1160 (hereinafter termed the date) can be performed by another application, such as the install/security application. The captured information originates in the system address space (e.g., where the protocol drivers, rerouting driver, NDIS and MACs reside). Many applications need access to data originating from the system address space. The typical way this is accomplished is by making system calls (e.g., I/O APIs). These system calls are not very efficient in their use of CPU resources, typically copying memory to and from user address space into the system address space. In addition, these system calls also create at least two costly CPU state transitions from user to supervisor mode and back to user mode. One option to minimize the overhead is to run more of the code in the system address space. Doing this increases the difficulty in debugging the software and has the disadvantage of not being able to take advantage of multiple CPUs on many operating systems.

In one embodiment, a shared memory buffer is created between device drivers in system address space and application(s) in the user space. In this way an application can get access to data in system address space without any more overhead than a memory read. However, it is necessary to prevent conditions where a CPU executing driver code may be simultaneously modifying memory being accessed by a CPU executing the application.

To prevent this situation of simultaneous use, in one embodiment, two counters may be used to signal the state of the buffer. One counter ("write count") is the count of the number of items written into the memory buffer. Another counter ("read count") is the count of number of items read from the buffer. Only the producer modifies the "write count" and only the consumer modifies the "read count." If the "read count" is not equal to the "write count", then valid data is contained in the buffer. One example of this is shown below.

Application execution:
Loop:
if "read count" < > "write count"
Get next buffer
Read next item
Process item
Increment read count
Else
Wait for signal
endif
Go to loop
System address execution:
Loop:
Wait for incoming data
Allocate empty buffer
If allocation failed
   Discard data
   Go to loop
endif
Process data
Write data into buffer
Increment write count
If "write count"="1+read count"; put data into an empty
   buffer
   Send signal
Go to loop FIGS. 11A and 11B illustrate one embodiment of the present invention that provides packet-based security through utilization of the double binding to the NDIS 1115. Particularly, any bindings from the NDIS 1115 to the protocol driver(s) 1110 are used to route packets through the rerouting driver to the protocol driver(s) 1110. However, the bindings of the MAC(s) 1120 to the rerouting driver 1135 are used as a mechanism to capture the packets for later security evaluation. By providing a separate path for the capturing of the packets for security evaluation, a separate context is provided for this capturing process. As is well known in the art, the provision of a separate context allows greater programming flexibility during the capturing process.

In an alternative embodiment, the double bindings are not used. Rather, either the packets are not captured for later security evaluation or the packets are captured during the routing from the NDIS 1115 to the protocol driver(s) 1110. In a system in which the packets are captured during the routing from the NDIS 1115 to the protocol driver(s) 1110, each of the MAC(s) 1120 need not be bound to the rerouting driver 1135 (the optional step 540 from FIG. 5 is not performed).

For example, in one embodiment of the present invention, using only a single binding to the NDIS 1115, information that is deemed acceptable by the filter unit 1155, is routed to the template 1150 for routing to the appropriate protocol driver 1110. Information that is deemed not acceptable by the filter unit 1155, is then routed back to the template 1150 for routing to the capturing unit 1160.

Thus, there has been described alternative embodiments of the present invention which provide distributed packet based security. The embodiments provide for the intercept and evaluation of information packets received over a network by a rerouting driver with associated software. After evaluation, the information may be allowed continued routing to the protocol driver. Alternatively, the information may be stopped and/or saved for further security evaluations. The embodiments can be remotely distributed and installed on individual computers on a remote host while in operation without shutdown and restart of the computer system.

Further, while the present embodiment describes a system to provide distributed packet based security, other embodiments may be practiced by providing other evaluation parameters in the filter unit. For example, the filter unit could contain parameters to filter and capture information with particular routing information, and in this way monitor utilization of the network.

Also, it should be understood that although the alternative embodiments were described in terms of a remote installation, the embodiments can be manually installed on individual computers if so desired.

To avoid the shutdown and restart, access to predetermined instruction code in the NDIS should be disabled and then re-enabled to effect the overwriting of the memory addresses with static patch code. As above described, this can be done on certain single processor systems by disabling and reenabling interrupts. Each of the above-described embodiments can be alternatively implemented in multiprocessor systems by disabling and re-enabling access as described below.

Figure 12:
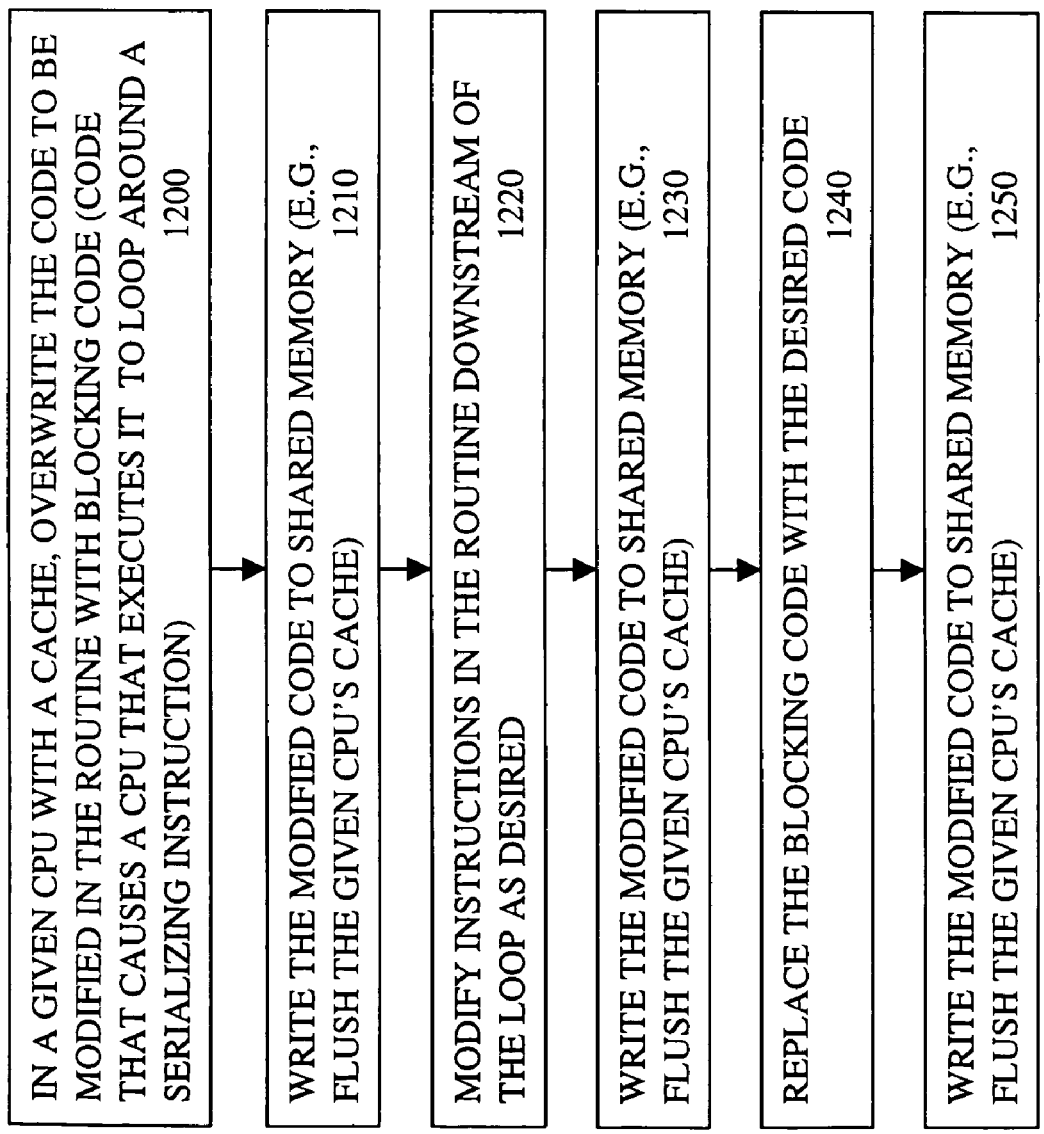
FIG. 12 is a flow diagram illustrating the disabling and re-enabling of access to code in a multiprocessor system according to one embodiment of the invention.

FIG. 12 is a flow diagram illustrating the disabling and re-enabling of access to code in a multiprocessor system according to one embodiment of the invention. At block 1200, in a given central processing unit (CPU), the code that is to be modified is brought into the cache of the given CPU and is overwritten with "blocking code" to create a first version of the code. The blocking code will prevent other CPUs from progressing past this code. While the blocking code can be implemented any number of ways, one way is to write code that causes the CPU to loop around a serializing instruction. As a result, any of the other CPUs (i.e., the CPUs not performing the patch), cannot access (are disabled) the code to be modified.

At block 1210, the first version of the code is written from the given CPU's cache into shared memory. As a result, if another CPU attempts to execute the code to be modified, it will access the blocking code from the shared memory.

At block 1220, the code beyond the blocking code can now be modified in the given CPU's cache as required to create a second version of the code. For example, in one embodiment, the code can be overwritten with template jumps to effect the static patch of the NDIS.

At block 1230, the second version of the code is written from the given CPU's cache into shared memory.

At block 1240, the previously inserted blocking code in the given CPU's cache is now overwritten with the desired code to create a third version of the code.

At block 1250, the third version of the code (without the blocking code) is written into shared memory. As a result, the patched code is in the shared memory and any CPU that now attempts to execute the code at that address will get the patched code.

Utilizing the above technique allows installation of the above-described alternative embodiments of the present invention on single and multiple processor systems.

The above-described embodiments have been described in terms of a static patch to predetermined instruction code addresses on the NDIS. Static patching requires that the offsets for the calls in the NDIS be predetermined. However, in certain situations, it is desirable to automate the identification of the CALL addresses in the NDIS and/or to accommodate different and/or new operating system versions utilizing different addresses. Accordingly, one embodiment provides a dynamic patch technique that patches individual instruction code locations as information is received from them by the rerouting driver. In this manner, incrementally each CALL is patched until all the specific instruction locations from which information was passed are patched.

Figure 13:
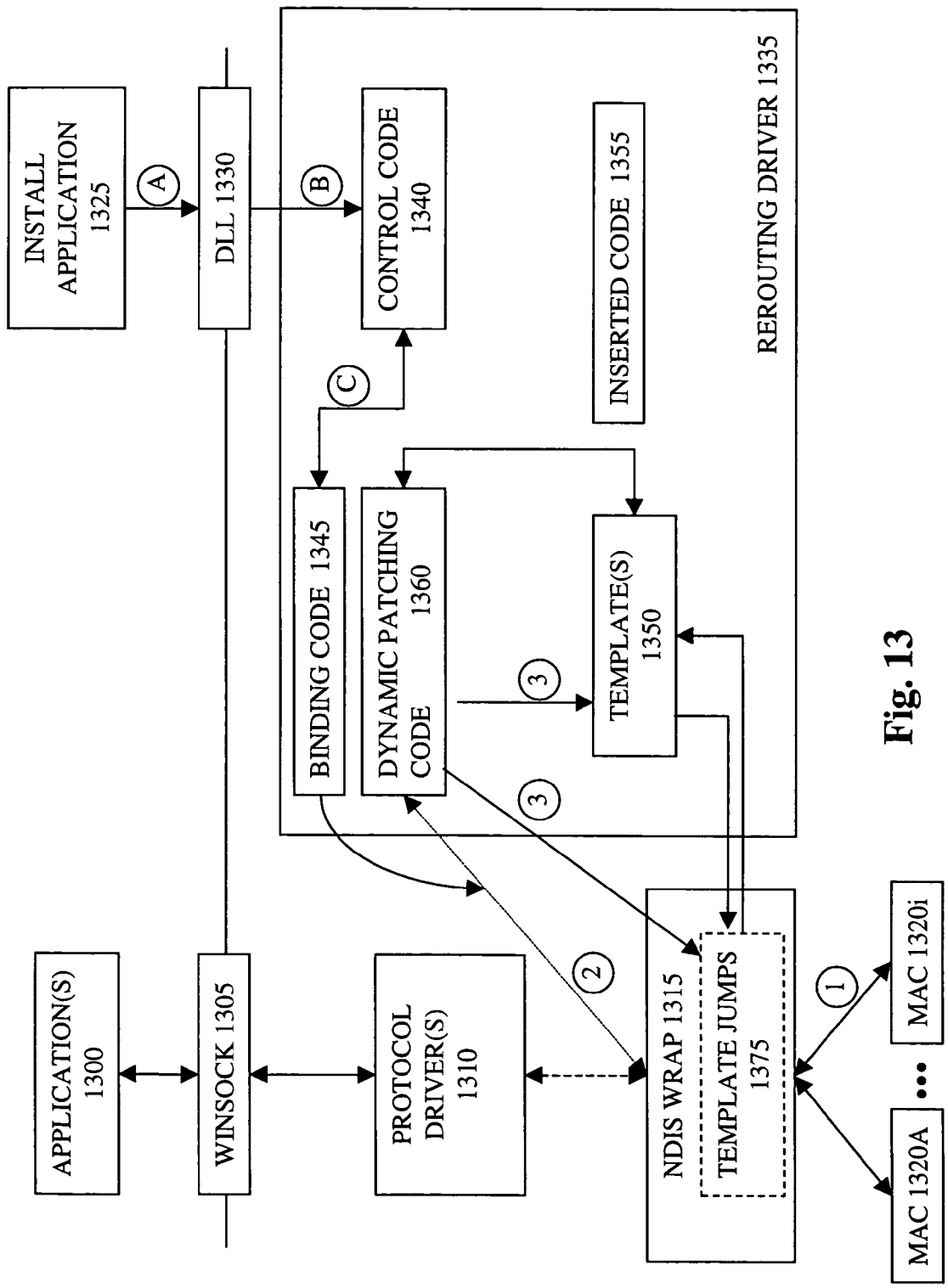
FIG. 13 is a block diagram illustrating the dynamic patching of a rerouting driver between MACs and protocol drivers according to one embodiment of the invention; and, FIG. 14 is a flow diagram illustrating the operation of the dynamic patching code 1360 according to one embodiment of the invention.

FIG. 13 is a block diagram illustrating the dynamic patching of a rerouting driver between MACs and protocol drivers according to one embodiment of the invention. As previously described, the install application 1325, DLL 1330, and rerouting driver 1335 are copied to memory in the target computer and the install application 1325 is started. The install application 1325 through the interface provided by the DLL 1330 requests the rerouting driver 1335 be loaded. The rerouting driver 1335 then requests control code 1340 execute binding code 1345 to establish a new binding between the dynamic patching code 1360 in the rerouting driver 1335 and every MAC 1320 A-i.

There is now one binding that will route information to the dynamic patching code 1360 in the rerouting driver 1335. This binding is represented in FIG. 13 as the dotted line between the NDIS 1315 and the dynamic patching code 1360. Now the rerouting driver 1335 waits to receive a packet of information in order to determine the location in the NDIS 1315 instruction code where it must insert a patch.

At Number 1, information is received by a MAC 1320 from the network. This information is forwarded to the NDIS 1315 for routing to the appropriate protocol driver(s) 1310 and/or the rerouting driver 1335. The NDIS 1315 forwards the information to the protocol driver 1310 as no patches of the NDIS 1315 have been made. Due to the multiple bindings, the NDIS 1315 additionally forwards the same information to the dynamic patching code 1360. The dynamic patching code 1360 determines if a dynamic patch should be made to the instruction code address that sent the information.

At Number 3, if a dynamic patch should be made to the instruction code address that sent the information, a dynamic patch is executed by the dynamic patching code 1360. The dynamic patching code 1360 will overwrite the specified code in the NDIS 1315 with a template jump 1375 to a template 1350 in the rerouting driver 1335. The next time information is passed through the NDIS 1315 at that instruction code location, information destined for protocol driver 1310 will be routed to the dynamic patching code 1360 in the rerouting driver 1335 for further action as described below with reference to FIG. 14.

Figure 14:
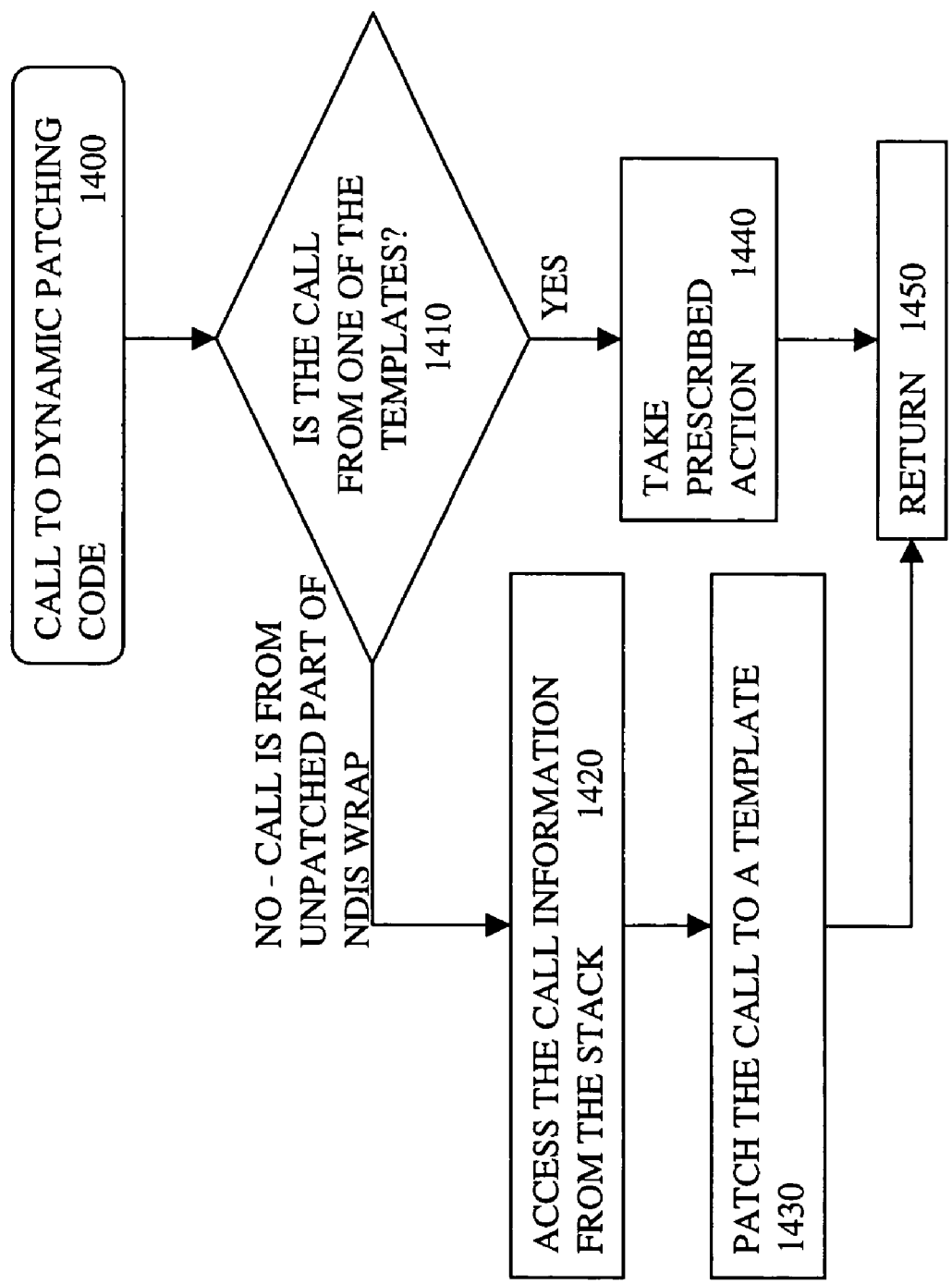

FIG. 14 is a flow diagram illustrating the operation of the dynamic patching code 1360 according to one embodiment of the invention. At block 1400, the dynamic patching code 1360 receives a call. As the dynamic patching code is dually bound, this call could be from one of the templates or from the NDIS 1315. At block 1410, the dynamic patching code 1360 determines if the call is from one of the templates.

If the answer is yes, the call is routed to the inserted code for further action (see block 1440). On completion of the inserted code, the call is returned to the template for further action (see block 1450).

If the answer in block 1410 is no, the call was received from an unpatched part of the NDIS 1315. Therefore, action must be taken to patch the instruction code in the NDIS 1315. At block 1420, the call information is accessed from the CALL stack. At block 1430, the call is patched as previously described. From block 1430, control passes to block 1450.

Thus, there has been described one embodiment of the present invention which remotely installs protocol drivers using a dynamic patch of the NDIS. As some information must pass from the NDIS to the protocol driver to establish the location of the NDIS instruction code to be patched, the dynamic patch is not as initially effective as the static patch embodiments earlier described.

Embodiments can use combinations of the static/dynamic patching techniques. For example, if the data on a given operating system is available, the static patching technique is used. However, if the data is not available, the user is notified and/or the dynamic patching technique is used. As another example, the static patching technique could be used for all known calls and the dynamic patching technique could be installed in case one or more calls were missed.

While the invention has been described in relation to remote installation of protocol drivers and packet based security systems, the present invention may also be used for installation of other software that utilizes drivers that must be bound to the NDIS to be operational. In addition, while embodiments of the invention have been described in relation to a packet based security system, alternative embodiments could be implemented such that other inserted code could be utilized to perform other operations with the redundant code.

It is to be noted that the items shown in FIGS. 3–14 are stored and executed on a computer system. Such a computer system stores and communicates (internally and with other computer systems over a network) code and data using machine readable media, such a magnetic disks, optical disks, random access memory, read only memory, etc. In addition, while one embodiment is described in which the parts of the present invention are implemented in software, alternative embodiments can implement one or more of these parts using any combination of software, firmware, and/or hardware.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A machine-readable medium having stored thereon sequences of instructions which, when executed by a processor, cause the processor to perform the acts of:

disabling access to at least a first section of computer code in a network driver software interface that is being executed by the processor by overwriting computer code that is executed before the first section of computer code with blocking computer code, wherein the network driver software interface provides for communication between one or more media access control units and one or more protocol drivers in a computer system according to a set of bindings;

executing the blocking computer code with the processor;

patching the first section of computer code while the blocking computer code of the network driver software interface is being executed by the processor and without stopping complete operation of the network driver software interface, the patching of the first section of code comprising inserting a template jump for forwarding call instructions from the network driver software interface to a template in a rerouting driver, the template comprising new computer code for controlling communications, the template jump and template allowing the rerouting driver to control communication between one or more media access control units and one or more protocol drivers in the computer system; and re-enabling access to the patched first section of computer code by replacing the blocking computer code with the patched first section of computer code.

2. The machine-readable medium of claim 1 wherein the patching is static patching.

3. The machine-readable medium of claim 2, wherein template jumps are inserted in the network driver software interface so that a CALL instruction to the protocol driver is replaced with a JUMP to the template in the rerouting driver, the template containing the CALL instruction.

4. The machine-readable medium of claim 2 wherein the patching of the first section of computer code creates at least one new binding between the network driver software interface and the rerouting driver.

5. The machine-readable medium of claim 4 wherein the at least one new binding provides for communication between one or more media access control units and a capturing unit in the rerouting driver.

6. The machine-readable medium of claim 5 wherein the capturing unit is used to intercept communications over the at least one new binding.

7. The machine-readable medium of claim 1 wherein the patching is dynamic patching.

8. The machine-readable medium of claim 7 wherein the dynamic patching includes establishing a new binding between at least one media access control unit and dynamic patching computer code in the rerouting driver.

9. The machine-readable medium of claim 8 wherein template jumps are inserted in the network driver software interface so that a CALL instruction to the protocol driver is replaced with a JUMP to the template in the rerouting driver, the template containing the CALL instruction.

10. A computer implemented method comprising:

transmitting from a remote host to a fit target computer on a network an installation application and a rerouting driver;

transmitting from the remote host to the first target computer a command to cause the first target computer to execute the installation application;

the first target computer, responsive to receipt of the command, executing the installation application, wherein the first target computer includes a network driver software interface that provides for communication between one or more media access control units and one or more protocol drivers according to a set of bindings; and the first target computer, responsive to executing the installation application, causing the modification of the network driver software interface to insert the rerouting driver into the one or more communication paths provided by the set of bindings while the network driver software interface is being executed by the first target computer and without restarting the first target computer, the first target computer comprising a multiprocessor system, wherein the insert of the rerouting driver, further comprises:

the installation application disabling access to a least a first section of code in the network driver software interface by overwriting code prior to the first section with blocking code and without stopping complete operation of the network driver software interface;

the installation application patching the first section of code while the blocking code is being executed by the processor, the patching comprising inserting a template jump for forwarding call instructions from the network driver software interface to a template in the rerouting driver, the template comprising new computer code for controlling communications, the template jump and template allowing the rerouting driver to control communication between the one or more media access control units and the one or more protocol drivers; and re-enabling access to the patched first section of computer code by replacing the blocking computer code with the patched first section of computer code.

11. The computer implemented method of claim 10 wherein the modification of the network driver software interface is by static patching.

12. The computer implemented method of claim 11 wherein the template jumps are inserted in the network driver software interface so that a CALL instruction to the protocol driver is replaced with a JUMP to the template in the rerouting driver, the template containing the CALL instruction.

13. The computer implemented method of claim 10 wherein the modification of the network driver interface is by dynamic patching.

14. The computer implemented method of claim 13 wherein the dynamic patching further comprises establishing a new binding between at least one media access control unit and dynamic patching code in the rerouting driver.

15. The computer implemented method of claim 14 wherein the template jumps are inserted in the network driver software interface so that a CALL instruction to the protocol driver is replaced with a JUMP to the template in the rerouting driver, the template containing the CALL instruction.

* * * * *

UNITED STATES PATENT AND TRADEMARK OFFICE
CERTIFICATE OF CORRECTION

| | | |
|---|---|---|
| PATENT NO. | : 7,181,486 B1 | |
| APPLICATION NO. | : 09/456894 | |
| DATED | : February 20, 2007 | |
| INVENTOR(S) | : Clinton Edward Lum | |

It is certified that error appears in the above-identified patent and that said Letters Patent is hereby corrected as shown below:

Claim 10, column 14, line 51, "transmitting from a remote host to a fit target computer on" should read -- transmitting from a remote host to a first target computer on --

Signed and Sealed this

Seventeenth Day of April, 2007

JON W. DUDAS
*Director of the United States Patent and Trademark Office*